(12) United States Patent
Meulblok et al.

(10) Patent No.: US 12,535,313 B2
(45) Date of Patent: Jan. 27, 2026

(54) BODY FOR HOLDING A FIBER OPTIC STRAIN SENSOR, A SYSTEM INCLUDING THE BODY, AND A METHOD FOR DETERMINING STRAIN IN AN OBJECT

(71) Applicant: OPTICS11 B.V., Amsterdam (NL)

(72) Inventors: Bastiaan Meulblok, The Hague (NL); Johannes Maria Singer, Leidschendam (NL); Eric Meijer, The Hague (NL); Devrez Mahmet Karabacak, Leidschendam (NL)

(73) Assignee: OPTICS11 B.V., Amsterdam (NL)

( * ) Notice: Subject to any disclaimer, the term of this patent is extended or adjusted under 35 U.S.C. 154(b) by 947 days.

(21) Appl. No.: 17/052,728

(22) PCT Filed: May 2, 2019

(86) PCT No.: PCT/NL2019/050259
§ 371 (c)(1),
(2) Date: Nov. 3, 2020

(87) PCT Pub. No.: WO2019/212347
PCT Pub. Date: Nov. 7, 2019

(65) Prior Publication Data
US 2021/0231431 A1 Jul. 29, 2021

(30) Foreign Application Priority Data
May 3, 2018 (NL) ..................................... 2020869

(51) Int. Cl.
*G01B 11/16* (2006.01)
*G01L 1/22* (2006.01)

(52) U.S. Cl.
CPC .............. *G01B 11/16* (2013.01); *G01L 1/225* (2013.01)

(58) Field of Classification Search
CPC ....................................................... G01L 1/225
(Continued)

(56) References Cited

U.S. PATENT DOCUMENTS 5,010,770 A * 4/1991 Berthold ............... G01L 9/0011
250/231.19
5,380,995 A * 1/1995 Udd .................... G01D 5/35303
356/478
(Continued)

FOREIGN PATENT DOCUMENTS

CN 106441387 A 2/2017
EP 1816432 A1 8/2007
(Continued)

OTHER PUBLICATIONS

International Search Report and Written Opinion dated Sep. 5, 2019, for International Patent Application No. PCT/NL2019/050259.

*Primary Examiner* — Kaveh C Kianni
(74) *Attorney, Agent, or Firm* — KARCESKI IP LAW, PLLC

(57) ABSTRACT

A device and method for holding a strain sensor for determining strain in an object includes a body. The body of the device includes a surface mountable frame, the frame being plate-shaped and including: at least two anchor portions for enabling attachment to a surface of the object, a strain sensitive region in an intermediate position between a first anchor portion and a second anchor portion of the at least two anchor portions, a sensor connection portion configured to hold at least one strain sensor for enabling attachment of the strain sensor to the frame in the strain sensitive region, and at least one elastic portion arranged in the strain sensitive region, the elastic portion being formed by a spring structure configured to modify a strain transmission from the
(Continued)

object to the sensor connection portion of the frame. Preferably, the device holds a fiber optic strain sensor.

13 Claims, 15 Drawing Sheets

(58) Field of Classification Search
USPC .......................................................... 385/13
See application file for complete search history.

(56) References Cited

U.S. PATENT DOCUMENTS

| | | | | |
|---|---|---|---|---|
| 6,575,033 B1* | 6/2003 | Knudsen | ............... | G01P 15/093 |
| | | | | 73/514.16 |
| 6,575,965 B1* | 6/2003 | Fitch | ................ | A61B 17/12022 |
| | | | | 606/15 |
| 6,882,429 B1* | 4/2005 | Weitekamp | .......... | G02B 6/3504 |
| | | | | 356/482 |
| 7,567,740 B2* | 7/2009 | Bayindir | ............ | G02B 6/02361 |
| | | | | 385/100 |
| 7,786,719 B2* | 8/2010 | Kurosawa | ............ | G01R 15/247 |
| | | | | 324/96 |
| 8,168,120 B1* | 5/2012 | Younis | ................. | G01N 29/022 |
| | | | | 422/68.1 |
| 9,104,271 B1* | 8/2015 | Adams | .................. | G06F 3/0233 |
| 9,389,248 B2* | 7/2016 | Sasaki | ................ | G01D 5/35322 |
| 11,857,268 B2* | 1/2024 | Bydlon | .................. | A61B 34/20 |
| 2001/0019103 A1* | 9/2001 | Sugai | ...................... | G01L 1/246 |
| | | | | 250/227.18 |
| 2002/0101130 A1* | 8/2002 | Ribak | ...................... | H10N 30/2047 |
| | | | | 310/311 |
| 2003/0127587 A1* | 7/2003 | Udd | ........................ | G01L 1/246 |
| | | | | 250/227.14 |
| 2005/0254061 A1* | 11/2005 | Alphonse | .............. | G01N 21/49 |
| | | | | 356/479 |
| 2005/0265649 A1* | 12/2005 | da Silva, Jr. | ........... | G01N 21/80 |
| | | | | 385/13 |
| 2006/0072888 A1* | 4/2006 | Lagakos | ................. | G01L 7/086 |
| | | | | 385/115 |
| 2007/0193362 A1* | 8/2007 | Ferguson | ........... | G01K 11/3206 |
| | | | | 73/800 |
| 2008/0087047 A1* | 4/2008 | Bayindir | .......... | B29D 11/00663 |
| | | | | 257/E31.093 |
| 2008/0255629 A1* | 10/2008 | Jenson | ................... | A61N 1/056 |
| | | | | 607/19 |
| 2009/0058422 A1* | 3/2009 | Tenghamn | ............. | G01V 3/083 |
| | | | | 324/344 |
| 2009/0196543 A1* | 8/2009 | Lagakos | ............... | G02B 6/3514 |
| | | | | 385/12 |
| 2009/0252451 A1* | 10/2009 | Lagakos | ............ | G01D 5/35312 |
| | | | | 385/13 |
| 2010/0316088 A1* | 12/2010 | Bayindir | ................. | C03C 25/54 |
| | | | | 374/100 |
| 2012/0026482 A1* | 2/2012 | Dailey | .................... | G01L 1/242 |
| | | | | 356/43 |
| 2012/0162661 A1* | 6/2012 | Dagalakis | .......... | G01B 9/02051 |
| | | | | 356/482 |
| 2012/0293806 A1* | 11/2012 | Cranch | .............. | G01D 5/35383 |
| | | | | 374/E13.001 |
| 2013/0028555 A1* | 1/2013 | Dailey | ............... | G01D 5/35316 |
| | | | | 385/12 |
| 2013/0330032 A1* | 12/2013 | McNeilly | ............. | H03K 17/965 |
| | | | | 385/13 |
| 2014/0046191 A1* | 2/2014 | Anker | .................. | A61B 5/1127 |
| | | | | 600/407 |
| 2016/0146607 A1* | 5/2016 | Celikel | ................ | G01C 19/722 |
| | | | | 356/465 |
| 2016/0209208 A1* | 7/2016 | Tsai | ...................... | G01B 11/18 |
| 2018/0034912 A1* | 2/2018 | Binder | ................... | H04L 67/12 |
| 2021/0113274 A1* | 4/2021 | Bydlon | ................. | G01L 1/246 |

FOREIGN PATENT DOCUMENTS

| | | |
|---|---|---|
| EP | 3312556 A1 | 4/2018 |
| WO | 2011026616 A1 | 3/2011 |

\* cited by examiner

BODY FOR HOLDING A FIBER OPTIC STRAIN SENSOR, A SYSTEM INCLUDING THE BODY, AND A METHOD FOR DETERMINING STRAIN IN AN OBJECT

CROSS-REFERENCE TO RELATED APPLICATION(S)

This is a National Stage Entry into the United States Patent and Trademark Office from International Patent Application No. PCT/NL2019/050259, filed on May 2, 2019, which is based on and claims priority to Netherlands Patent Application No. NL 2020869, filed on May 3, 2018, the entire contents of both of which are incorporated herein by reference.

FIELD OF THE INVENTION

The invention relates to a body for holding a strain sensor, preferably a fiber optic strain sensor, for determining strain in an object. Furthermore, the invention further relates to a system for determining strain in an object. The invention further relates to a method for determining strain in an object using a body for holding a strain sensor, a method for manufacturing the body, and the use of the body.

BACKGROUND TO THE INVENTION

A strain sensor can be used for mapping deformations via stresses. Commonly, the strain sensor is attached to an object or structure by suitable attachment means, for determining or estimating the strain experienced by the object at the location at which the strain sensor is attached. As the object/structure is deformed, the strain sensor also becomes deformed, resulting in a measurable change in a physical quantity which can be linked to a particular stress level or strain. Many different types of strain sensors are known.

However, many applications involve large deformations which need to be characterized. One of the challenges is that in some cases the deformations result in relatively large strains which cannot be accurately measured or which result in damage to the strain sensor. This may for example be the case when fiber optic strain sensors are employed for measuring relatively large strain along an optical fiber. In fiber optic strain sensors, strain measurements can be distributed along the fiber, and/or taken at predetermined points on the fiber. Large strain levels may break the fiber (e.g., glass). For instance, when a grid of strain sensors is attached to a (large) wall structure, such as a dike, for monitoring and mapping the stress and/or deformation, large strain levels may be induced locally (of 20 000 microstrains or larger for example).

Therefore, in some cases, too much tension may be applied on the strain sensor. Pre-tensioning of strain sensor may result in additional challenges in assembly and/or stability. Furthermore, too much force on the attachment means may result in creep and/or difficulty in assembly.

There is a need for being accurately able to determine deformations or strains using a strain sensor. Moreover, there is a desire for improving strain measurements using a strain sensor, in particular in case of application involving large deformations.

SUMMARY OF THE INVENTION

It is an object of the invention to provide for a method and a system that obviates at least one of the above mentioned drawbacks.

Additionally or alternatively, it is an object of the invention to provide for a body and method for holding a strain sensor for determining strain in an object.

Additionally or alternatively, it is an object of the invention to enable strain measurements by means of a strain sensor involving large deformations.

Additionally or alternatively, it is an object of the invention to reduce the risk of damaging the strain sensor when performing strain measurements using a strain sensor.

Thereto, the invention provides for a body for holding a strain sensor for determining strain in an object. The body comprises a surface mountable frame. The frame is plate-shaped and includes: at least two anchor portions for enabling attachment to a surface of the object, a strain sensitive region in an intermediate position between a first anchor portion and a second anchor portion of the at least two anchor portions, a sensor connection portion configured to hold at least one strain sensor for enabling attachment of the strain sensor to the frame in the strain sensitive region, and at least one elastic portion arranged in the strain sensitive region, the elastic portion being formed by a spring structure configured to modify a strain transmission from the object to the sensor connection portion of the frame.

In this way, in an embodiment using a fiber optic strain sensor, a risk of damaging or breaking the fiber optic strain sensor can be effectively reduced. Furthermore, it may also no longer be necessary to pre-tension the fiber optic strain sensor to a large amount. The body can be anchored at the two anchor portions to the object, wherein the deformation between the two anchor portions is to be determined by means of a fiber optic strain sensor, which can be attached or secured to the sensor connection portion of the body.

The spring structure may comprise one or more springs or spring elements. If the object whereto the body is attached stretches, the at least first anchor portion and the second anchor portion can move with respect to each other, following the deformation (e.g., stretching) of the body. However, by means of the spring structure, only a portion of the movement is transferred to the sensor connection portion. The sensor connection portion is the location where the fiber optic strain sensor is clamped on the frame of the body. The sensor connection portion may have means for holding the fiber optic strain sensor, such as fiber optic sensor, positioned in a direction extending between at least the first anchor portion and the second anchor portion. Other suitable orientations are possible for determining the strain caused by the relative movement between the first anchor portion and the second anchor portion.

Optionally, the plate is made out of a sheet of metal. The frame may for instance be formed out of a pre-formed sheet metal. The body may be configured to be welded on the object (e.g., wall or structure) at the at least two anchor portions. This can be achieved fairly easily due to the plate shape of the body. However, it is appreciated that other attachment means can also be employed for affixing the frame of the body to the object, for example using mechanical securing means, soldering, glue, etc. The anchor portions may be a location on the frame at which the frame is to be attached to the object.

The fiber optic strain sensor can be anchored between to be measured locations. For instance, the sensor connection portion may include a first sensor anchor point and a second sensor anchor point, wherein the fiber optic strain sensor is anchored between these two points. The first sensor anchor point and the second sensor anchor point may comprise means for securing the fiber optic strain sensor. For instance, when a fiber optic is used, the fiber may be held in place at the first sensor anchor point and the second anchor point. The fiber optic strain sensor is secured to the frame of the body in the strain sensitive region by means of said sensor connection portion.

Optionally, the sensor connection portion enables removable attachment of the fiber optic strain sensor to the frame of the body. The sensor connection portion may have clamping means configured to hold the fiber optic strain sensor in place in the strain sensitive region. The fiber optic strain sensor can be removed and/or replaced by another fiber optic strain sensor when desired. Optionally, the elastic portion at least partially surrounds the sensor connection portion.

The body is configured to be attached to the object. For this purpose, the plate-shaped frame of the body may have a complementary shape with respect to the object. The plate-shaped frame of the body may be flat or non-flat. Various shapes are possible. For instance, the plate-shaped frame may be curved so as to complementary fit on a non-flat curved surface. It is not required that additional features, such as securing means, wholes, pins, etc., are located at the anchor portions. As indicated above, attachment can be achieved by welding, soldering, gluing, etc.

In case of large deformations or stretching between the first anchor portion and the second anchor portion, a large force may be induced. The body may have to be pre-tensioned on the object. In accordance to the invention, pre-tensioning may be carried out beforehand, followed by securing the strain sensor (e.g., fiber) on the frame of the body, wherein pre-tensioning can be limited to a reduced level due to a resulting reduced strain transmission from the object to the sensor connection portion of the frame. As a consequence, also the risk associated with large pre-tensions regarding the creeping of the zero point of the sensor can be reduced. For instance, pre-tensioning can be limited to a tenth of the amount due to a transmission ratio of 10 to 1.

Optionally, the body is configured to provide a transmission ratio between an input action received by the at least two anchor portions of the frame and a sensing action applied to the fiber optic strain sensor via the sensor connection portion of the frame, the frame being arranged to convert the input action to the sensing action, wherein the transmission ratio is different than 1.

The spring structure influences the transmission ratio provided by the body. Instead of employing a direct one to one (1:1) strain coupling, a transmission ratio different than 1 can be employed by means of the body. The transmission ratio or conversion ratio depends on the characteristics of the spring structure. For instance, the transmission ratio can be changed/adapted by changing the number of springs, changing the dimensions of the springs, the orientation of the springs, and/or other properties of the spring structure. Different types of spring structures can be employed in the frame.

The spring structure can be adapted to obtain a predetermined transmission ratio. The spring structure may comprise one or more distinct spring elements. A down conversion of the transmission (e.g., 10 to 1) can be influenced by the spring structure type (shape, dimensions, etc.) and/or the amount of spring elements present in the spring structure. For instance, a down conversion of the transmission can be increased by adding more springs. The amount of stretching resulting from relative movement between at least the first anchor portion and the second anchor portion depends on the stiffness or flexibility of the spring structure or its one or more spring elements.

Optionally, the at least one elastic portion is configured to result in a localized reduced stiffness in the frame for obtaining a transmission ratio greater than 1.

The elastic portion can be considered as a weakened portion arranged in the strain sensitive region of the frame. The weakened portion can be formed by a spring structure having an increased elasticity for modifying a strain transmission from the object to the sensor connection portion in the strain sensitive region of the frame. In this way, a down conversion of strain resulting from loads/forces is achieved by means of the spring structure arranged in the frame of the body.

Advantageously, even large deformations, which may result in large strains, can be effectively mapped by using the body. A down conversion can be obtained by arranging the spring structure such that a transmission ratio greater than 1 is obtained. A down conversion of x to 1 means that only 1/x of the strain/movement is provided to the fiber optic strain sensor being secured on the frame by means of the strain connection portion. The transmission ratio T is in this case larger than 1. For example, if a down conversion of 10 to 1 is achieved by the body, only a tenth of the strain/movement gets on the fiber optic strain sensor (e.g., fiber optic) and transmission ratio can be defined as 10. This down conversion can be adjusted to a predetermined value by arranging a suitable layout of the spring structure (e.g., adding more springs, less springs, more travel distance, dimensioning, size, shape, spring configuration, orientation, spring type, etc.).

Optionally, the elastic portion is configured to have a stiffness lower than a stiffness provided by the fiber optic strain sensor held at the sensor connection portion of the frame.

Optionally, the sensor has two attachment points, wherein one attachment point is clamped to a location on the strain sensitive region and the other attachment point is connected to or attached near one of the at least two anchor portions.

Optionally, the transmission ratio T is smaller than 1.

Optionally, one or more elastic portions are attached to the sides of the frame.

Optionally, at least one elastic portion is arranged in series between the fiber optic strain sensor and one of the at least two anchor portions.

Optionally, at least one elastic portion is arranged parallel to the fiber optic strain sensor. For this purpose, the sensor connection portion may be arranged in parallel to the elastic portion, providing such orientation for the fiber optic strain sensor.

In an example, the body has at least one elastic portion arranged in series between the fiber optic strain sensor and one of the at least two anchor portions, and additionally, at least one elastic portion arranged parallel to the strain sensor. A combination of parallel and series elastic portions (e.g., springs) can result in a transmission ratio T different than 1. Many spring configurations are possible.

Optionally, the spring structure is formed by including at least one of one or more cut-outs, trenches or slits in the strain sensitive region of the frame.

Advantageously, by means of the cut-outs and/or slits in the plate-shaped frame of the body a specific pattern can be obtained which can act as a spring. The manufacturing of the spring structure in the frame can thus be greatly facilitated. In this way, it is relatively easy to obtain a specific transmission ratio with a high accuracy. Moreover, manufacturing deviations can be reduced since it is relatively easy to provide the plate-shaped frame with the cut-outs. In this way, the body can provide a high accuracy strain measurements with a predetermined transmission ratio. The manufacturing process can be greatly simplified by using cut-outs or slits going completely through the (relatively thin) plate-shaped frame (e.g., using laser cutting). The pattern of the one or more cut-outs, trenches or slits can at least partly determine the stiffness of the spring structure, so that a desired predetermined transmission ratio can be accurately obtained for the body.

Advantageously, the elastic portion is formed by one or more perforations arranged in one or more rows and/or columns. The perforations may have a square, rectangular, or circular shape. Other shapes are also possible. Many variants are envisaged.

The spring structure can be formed in a lengthwise/longitudinal direction along a path substantially parallel to a longitudinal direction of the at least one fiber optic strain sensor to be attached to the sensor connection portion of the frame of the body. Optionally, a slit or groove is formed in the frame along a path. The slit or groove may have a contoured shape.

It is appreciated that a spring structure in the frame can also be formed by means of corrugations, the use of other material properties, a changing thickness, holes, etc. or a combination thereof. Those skilled in the art will appreciate that many designs involving various patterns are equally feasible.

Optionally, the spring structure in the frame is formed by means of laser cutting. More accurate results can be obtained using a laser cut spring structure, since the spring rate of the spring structure can be determined more accurately. The body can be first modelled for determining the shape and/or dimensions of the laser cutting. For instance, a computational model, such as a finite element model, can be used for determining the shape and/or dimensions of the spring structure. Other types of simulations may also be employed.

Optionally, the spring structure in the frame is formed by means of punching out portions of the frame. Additionally or alternatively, a spring structure may be formed in the frame of the body by means of stamping, perforation and/or pressing. Other manufacturing processes may also be used for obtaining the spring structure in the frame, such as for example mechanical cutting from a sheet metal.

Optionally, the sensor and/or the elastic portion are arranged symmetrically in the strain sensitive region of the body.

It is appreciated that the frame of the body may have a circular, square, rectangular, polygonal, or curved shape. Other shapes are also possible. Many variants are envisaged.

Optionally, the elastic portion is integral with the frame resulting in a unitary body made out of a single piece.

Optionally, the thickness of the plate is smaller than 5 mm, preferably smaller than 2.5 mm, more preferably smaller than 1.5 mm. In an advantageous embodiment, the plate has a thickness of around 1 mm. Other thicknesses are also possible. The thickness may depend on the application, the material properties of the body, etc.

Optionally, the fiber optic strain sensor extends in the strain sensitive region of the frame in a direction that is substantially parallel to a direction of the sensing action applied by the first and second anchor portions on the strain sensitive region. The sensor may for instance extend in a longitudinal direction when clamped on the sensor connection portion of the frame. In this way, the sensing action in the longitudinal direction of the body can be measured.

Optionally, the frame is configured to hold a plurality of fiber optic strain sensors extending in different directions with respect to each other, for sensing input actions applied in different directions. In this way, multi-directional strain measurements may be carried out by means of the body. A plurality of sensor connection portions may be provided on the frame of the body.

Optionally, the body has an elongated frame having a plurality of different strain sensitive regions, pairs of anchor portions, strain sensitive regions, sensor connection portions, and elastic portions arranged in succession in a longitudinal direction of the body.

Optionally, the frame is configured to hold a first fiber optic strain sensor and a second fiber optic strain sensor, wherein the first fiber optic strain sensor is configured to receive a first input action applied in a first direction and for converting the first input action into a first sensing action in a first sensing direction, wherein the second fiber optic strain sensor is configured to receive a second input action applied in a second direction and for converting the second input action into a second sensing action in a second sensing direction, wherein the first sensing direction is substantially perpendicular to the second sensing direction, the frame further including one or more first elastic members extending in the first direction and/or one or more second elastic members extending in the second direction. In the situation of a multi-directional strain measurement, a "rosette" configuration can be employed where three strain gauges are preassembled in a predetermined or controlled angle between them, such as 45°, 60° or 120°, such that 2-directional strain as well as the shear strain can be calculated. It will be appreciated that other rosette configurations can also be employed (e.g., rectangular, delta, tee rosette configuration, etc.). In an example, such a multi-directional strain configuration (e.g., rosette configuration) is preassembled with designated welding points to ensure easy installation. Here, Fiber Bragg Gratings provide a unique advantage that all the three strain gauges can be on the single fiber with mutually exclusive wavelengths such that the response of the different directions are recorded without crosstalk using single connection. In an example, the strain sensing sections are placed in a triangular fashion. Additionally or alternatively, one or more of the strain sensing sections have different transmission ratios.

Optionally, the multiple fiber optic strain sensor configuration is such that individual strain sensitive regions are crossing over a single area. Co-locating the strain sensitive regions enables making analysis of multi-directional strains more accurate. Additionally or alternatively, a more compact design can be obtained. The fiber optic cable may be looped to a plurality of bodies according to the invention.

Optionally, the fiber optic strain sensor is an intrinsic fiber optic sensor including at least one of a Fiber Bragg Grating, a photonic crystal fiber, a birefringent fiber, a fiber laser, or a multicore fiber. The sensor connection portion may be configured to hold such an intrinsic fiber optic sensor. In this way, an intrinsic fiber optic sensor can be attached to the frame of the body, in the strain sensitive region, allowing accurate measurements of the strain. An intrinsic fiber optic sensor can be used in combination with the body for deformation monitoring. Even large deformations can be determined without damaging the intrinsic fiber optic sensor by down conversion of the transmission (i.e., transmission ratio larger than 1). The transmission ratio provided by the body, which depends on the spring structure, can be chosen depending on the application and the expected strains.

According to a further aspect, the invention provides for a system for determining strain in an object, the system comprising one or more bodies according to the invention and one or more fiber optic strain sensors attached to the sensor connection portions of the frames of the bodies for sensing one or more input actions applied in one or more directions.

A plurality of bodies with the fiber optic strain sensor may be attached to the object (e.g., wall structure) for determining the strain at a plurality of locations. In this way, the strain on the object may be mapped. In an example, a chain of bodies are attached to the object. It is also possible to use a plurality of rows with bodies such that a matrix of bodies attached to the object is obtained.

Optionally, the body has an elongated body forming a strip including a plurality of consecutive strain sensitive regions. An elongated strip with an array of consecutive strain sensitive regions may be provided, enabling improved deformation mapping, each having a sensor connection portion in a region between anchor points. A plurality of spring zones, sensing zones and transmission zones can be obtained along the elongated strip. Optionally, each fiber optic sensor held at the plurality of consecutive sensor connection portions has a unique fiber Bragg grating wavelength allowing them to be interrogated with a single channel.

According to a further aspect, the invention relates to a sensor including the body according to the invention, wherein a fiber optic transducer element is attached to the sensor connection portion of the body.

According to a further aspect, the invention provides for a method for determining strain in an object using a body for holding a fiber optic strain sensor, the body comprising a surface mountable frame which is plate-shaped, the frame comprising at least two anchor portions for enabling attachment to a surface of the object, a strain sensitive region in an intermediate position between a first anchor portion and a second anchor portion of the at least two anchor portions, a sensor connection portion configured to hold at least one fiber optic strain sensor for enabling attachment of the fiber optic strain sensor to the frame in the strain sensitive region, and at least one elastic portion arranged in the strain sensitive region, the elastic portion being formed by a spring structure configured to modify a strain transmission from the object to the sensor connection portion of the frame; the method comprising the steps of: attaching the frame to the objects by means of the at least two anchor portions, anchoring the fiber optic strain sensor to the frame in the strain sensitive region by means of the sensor connection portion, and determining a value indicative of strain in the object by means of the fiber optic strain sensor.

The spring structure may be modified and adapted in several ways to obtain a predetermined transmission ratio. By means of down conversion, the risk of damaging the fiber optic strain sensor, being held by the body, can be reduced, even when high strains occur (e.g., as a result of large deformations in a structure/object).

The body may have a transmission ratio greater than 1. Alternatively, the body may have a transmission ratio less than 1.

According to a further aspect, the invention provides for a method for manufacturing a body configured for holding a fiber optic strain sensor for determining strain in an object, the body comprising a surface mountable frame, the frame being plate-shaped and including at least two anchor portions for enabling attachment to a surface of the object, a strain sensitive region in an intermediate position between a first anchor portion and a second anchor portion of the at least two anchor portions, a sensor connection portion configured to hold at least one fiber optic strain sensor for enabling attachment of the fiber optic strain sensor to the frame in the strain sensitive region, the method including: providing at least one elastic portion arranged in the strain sensitive region, the elastic portion being formed by a spring structure configured to modify a strain transmission from the object to the sensor connection portion of the frame, wherein the spring structure is formed by means of laser cutting features in the frame.

Advantageously, the body can be relatively easy to produce and that even the cost linked to implementing the body for performing strain measurements may be limited.

A load conversion to the fiber optic strain sensor connection portion, and thus the fiber optic strain sensor when attached to the body, can be adapted to a predetermined value by means of adapting the spring structure.

The frame of the body comprises a preformed spring structure. The spring structure may have one or more spring elements formed in the frame. The spring elements may for instance be cut out parts of the frame forming springs.

Optionally, the laser cut features include at least one of one or more cut-outs, trenches or slits in the strain sensitive region of the frame.

According to a further aspect, the invention provides for a use of the body according to the invention for determining strain in an object by means of a fiber optic strain sensor.

According to a further aspect, the invention provides for a body, system or method, wherein the body is adapted to hold a fiber optic strain sensor.

The details of the invention may be substituted with other technically equivalent elements and the materials used, as well as the shapes and dimensions of the various components, may vary according to requirements.

It will be appreciated that any of the aspects, features and options described in view of the body apply equally to the system and the described method. It will also be clear that any one or more of the above aspects, features and options can be combined.

BRIEF DESCRIPTION OF THE DRAWINGS

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawings.

DETAILED DESCRIPTION OF EMBODIMENT(S) OF THE INVENTION

Figure 1:
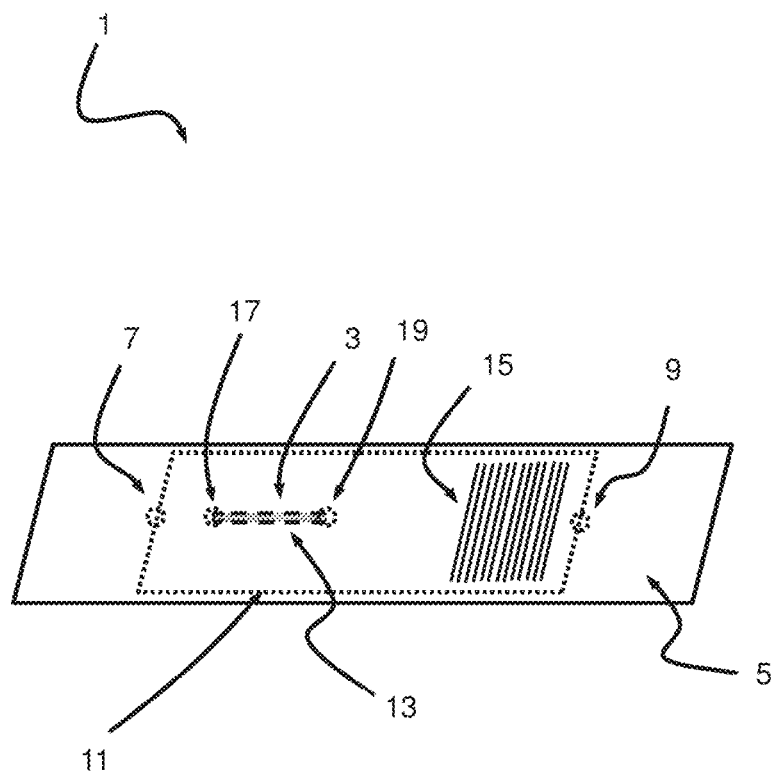
FIG. 1 shows a schematic diagram of an embodiment of a body.

FIG. 1 shows a schematic diagram of an embodiment of a body 1. The body 1 is configured to hold a fiber optic strain sensor 3 for determining strain in an object (not shown). The body 1 comprises a surface mountable frame 5. The frame 5 is plate-shaped and includes: at least two anchor portions 7, 9 for enabling attachment to a surface of the object. The frame 5 further comprises a strain sensitive region 11 in an intermediate position between a first anchor portion 7 and a second anchor portion 9 of the at least two anchor portions 7, 9. Furthermore, the frame 5 includes a sensor connection portion 13 configured to hold at least one fiber optic strain sensor 3 for enabling attachment of the fiber optic strain sensor 3 to the frame 5 in the strain sensitive region 11. The frame 5 further includes and at least one elastic portion arranged in the strain sensitive region 11. The elastic portion is formed by a spring structure 15 configured to modify a strain transmission from the object (not shown), to which the body is to be attached, to the sensor connection portion 13 of the frame 5. Optionally, the spring structure 15 extends over substantially the entire width of the frame 5.

The fiber optic strain sensor 3 is to be attached to the body 1 by means of the sensor connection portion 13. The sensor connection portion 13 may include at least two sensor anchor points 17, 19, namely a first sensor anchor point 17 and a second sensor anchor point 19. The fiber optic strain sensor may be anchored at least between these two points 17, 19. The first sensor anchor point 17 and the second sensor anchor point 19 may comprise means for securing or mounting the fiber optic strain sensor 3. For instance, when a fiber optic is used, the fiber may be held in place at the first sensor anchor point 17 and the second sensor anchor point 19.

The body 1 may be configured to provide a transmission ratio for converting a larger strain into a smaller strain experienced by the sensor connection portion 13, on which the fiber optic strain sensor 3 is mountable.

In an example, a series of openings, slits and/or holes are cut and/or punched out along a path to form the spring structure 15. Other methods can also be used, such as trench etching. In this way, the frame 5 of the body 1 may comprise a plurality of preformed mechanical springs resulting in a predetermined strain transmission ratio to the sensor connection portion 13 on which the fiber optic strain sensor 3 is to be attached.

Figure 2:
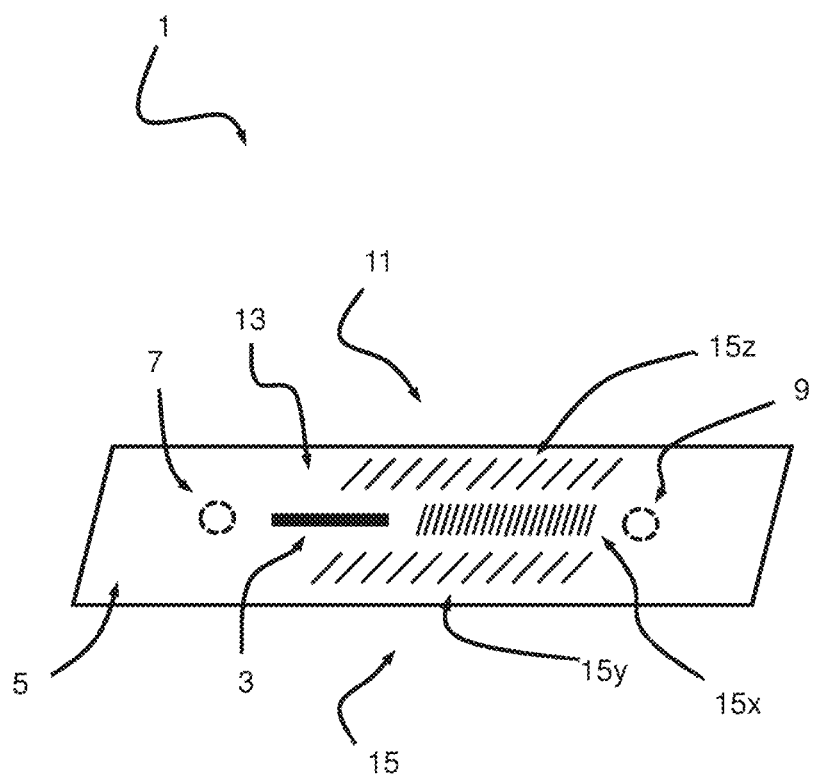
FIG. 2 shows a schematic diagram of an embodiment of a body.

FIG. 2 shows a schematic diagram of an embodiment of a body 1. In this example, a fiber optic strain sensor 3 is attached to the body 1. However, the fiber optic strain sensor 3 may be removable and other fiber optic strain sensors may also be used with the body 1. Also in this example, the frame 5 of the body 1 comprises a first anchor portion 7 and a second anchor portion 9. These anchor portions 7, 9 may be locations on the frame 5 where the frame 5 is to be anchored to the object. These locations may define a zone on the frame 5 (circle in dashed line in FIG. 2). It is appreciated that also a plurality of first anchor portions 7 and/or a plurality of second anchor portions 9 may be employed. Furthermore, the strain sensitive region 11 of the frame 5 comprises a spring structure 15 including a plurality of spring elements $15x$, $15y$, $15z$. The body is made elastic between anchor points 7 and 9. Instead of the spring element $15x$ (centrally between anchor points 7 and 9), the frame 5 may govern the rigidity if only a rigid frame surrounds said spring element $15x$ (e.g., if spring elements $15y$, $15z$ are absent).

Only a part of the movement between the first anchor portion 7 and the second anchor portion 9 is transferred to the sensor connection portion 13 in the strain sensitive region 11. Hence, by means of the at least one elastic portion in the strain sensitive region 11, a strain transmission ratio to the fiber optic strain sensor 3 can be provided being different than 1.

The body 1 is configured to provide a transmission ratio between an input action received by the at least two anchor portions 7, 9 of the frame 5 and a sensing action applied to the fiber optic strain sensor 3 (not part of body) via the sensor connection portion 13 of the frame 5. The spring structure 15 influences the transmission ratio provided by the body 1. The transmission ratio or conversion ratio depends on the characteristics of the spring structure. Hence the transmission ratio provided by the embodiment of FIG. 1 can be different with respect to that of the embodiment of FIG. 2. The transmission ratio can be effectively changed by changing the characteristics of the spring structure 15. In this way, a predetermined transmission ratio can be obtained. The spring structure 15 can cause a localized reduced stiffness in the frame 5 for obtaining a transmission ratio greater than 1. In this way, a down conversion of strain with respect to the strain levels in the object to which the sensor is attached, is achieved by means of the spring structure arranged 15.

Figure 3:
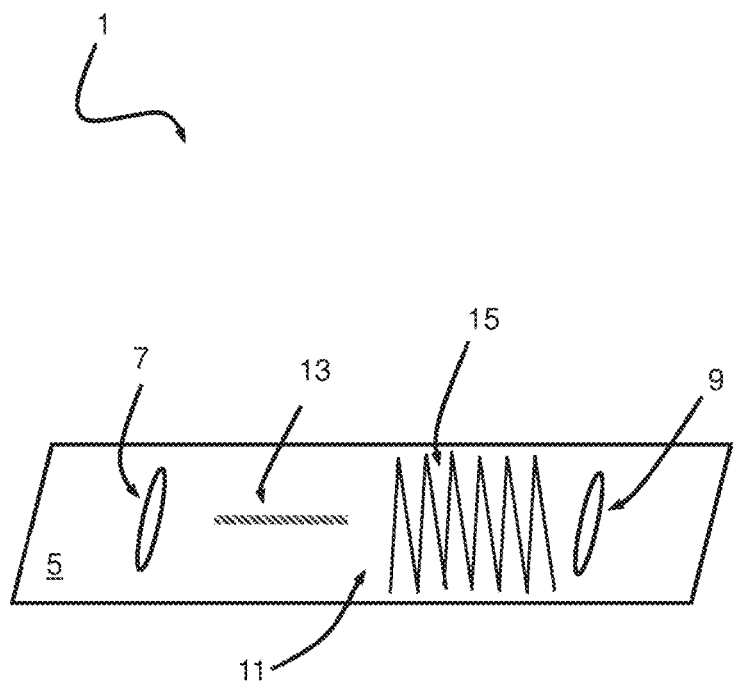
FIG. 3 shows a schematic diagram of an embodiment of a body.

FIG. 3 shows a schematic diagram of an embodiment of a body 1. The first anchor portion 7 and second anchor portion 9 define a strain sensitive region 11 therebetween. The sensor 3 (not shown in this figure) can be disposed at a location on the frame 5 where the strain is concentrated, within the strain sensitive region 11. The strain sensitive region 11 can be configured to exhibit strains in response to strains experienced by the object at a location at which the body 1 is attached to said object. When the first anchor portion and the second anchor portion move with respect to each other, for instance causing stretching in the strain sensitive region 11, the resulting stress or strain is concentrated at said strain sensitive region 11 and can thus also determined by the sensor. The transmission ratio of the strain to the sensor is effectively reduced by means of the elastic portion, as it is also disposed at a position where the strain is concentrated, namely in the strain sensitive region 11 of the frame 5 of the body 1.

Many types of spring structures 15 can be formed, such as a flexible plate spring, a flexible coupling. In this example, the spring structure 15 has a different shape/pattern compared to that of the embodiments of FIGS. 1 and 2.

Figure 4:
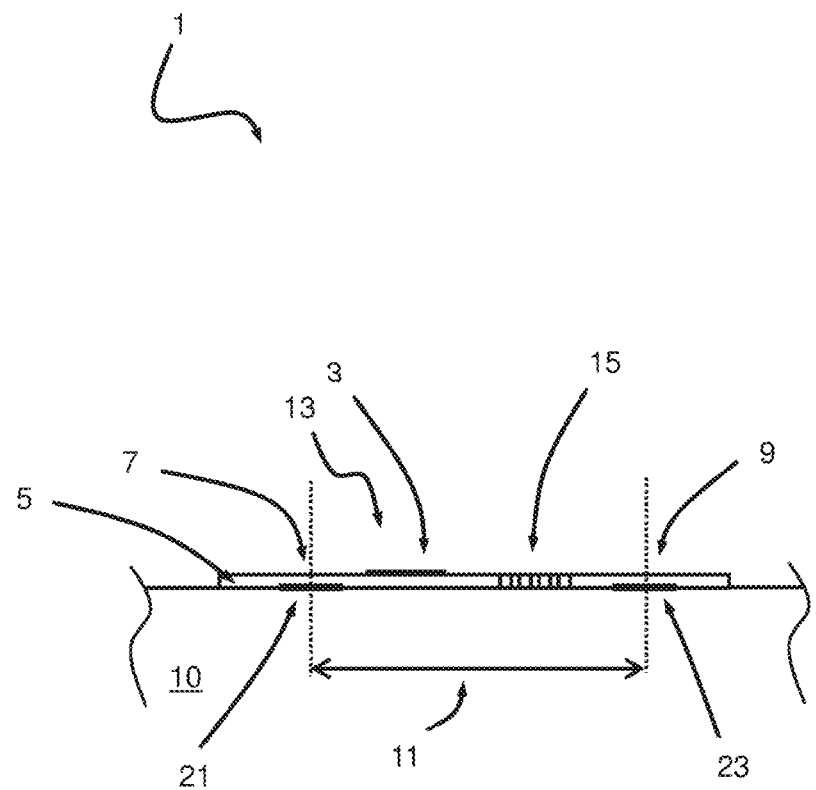
FIG. 4 shows a cross sectional side view of an embodiment of a body.

FIG. 4 shows a cross sectional side view of an embodiment of a body 1. The body 1 is secured to the object 10 by means of welding. At or near the first anchor portion 7 a first welding connection 21 is provided and at or near the second anchor portion 9 a second welding connection 23 is provided. A sensor 3 is mounted in the strain sensitive region 11 of the frame 5. Furthermore, the frame 5 comprises an elastic portion arranged in the strain sensitive region 11, the elastic portion being formed by a spring structure 15 configured to modify a strain transmission from the object 10 to the sensor connection portion 13 of the frame 5.

In this example, the body 1 is manufactured out of a metal material allowing welding. Alternatively, other materials may also be used for the body 1. For instance, it is possible that a part of the body 1 is made out of a first material and an other part is made out of a different material. Additionally or alternatively, other similar attachment methods are also possible, such as soldering, gluing, etc.

Figure 5:
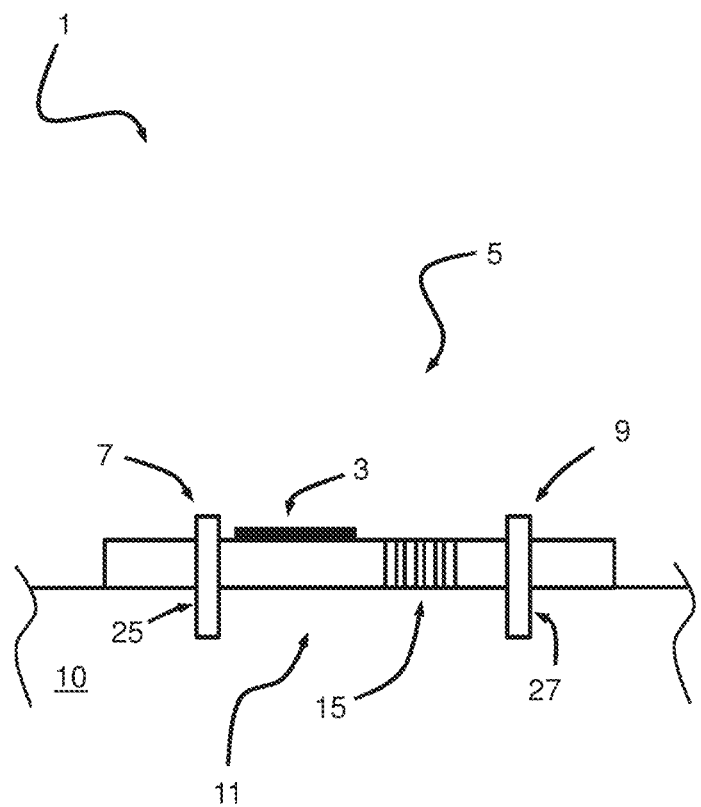
FIG. 5 shows a schematic diagram of an embodiment of a body.

FIG. 5 shows a cross sectional view of an embodiment of a body 1. In this example, the body is attached to the object 10 (e.g., wall structure) by means of mechanical fastening means 25, 27. For this purpose, the frame 5 may comprise a through hole at the first anchor portion 7 and the second anchor portion 9. The sensor is mounted in an intermediate position between the first anchor portion and a second anchor portion of the at least two anchor portions on the frame 5.

The anchor portions 7, 9 can serves as a mechanical connection point enabling affixing the frame 5 of the body 1 to the object 10, enable a fixed connection or attachment, for instance by means of a pin, screw, bolt, etc.

Figure 6:
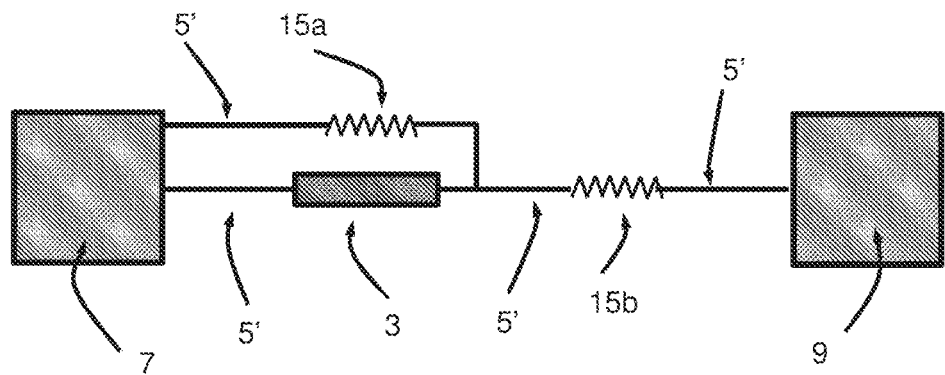
FIG. 6 shows a functional schematic diagram of an embodiment of a system.

FIG. 6 shows a functional schematic representation of an embodiment of a system. The first anchor portion 7, second anchor portion 9, sensor 3, and spring structure 15 are functionally shown. Remaining parts of the frame 5 connecting these features is represented by 5'. When the body 1 is attached to an object 10, the first anchor portion 7 and the second anchor portion 9 may move with respect to each other for determining the stress/strain by means of the sensor 3.

The obtained transmission ratio can be configured based on the selection of a resulting stiffness provided by the spring structures 15a, 15b, respectively arranged in series and parallel with respect to the sensor connection portion 13 and/or the fiber optic strain sensor 3. The rigidity provided by the fiber optic strain sensor 3, i.e., the fiber rigidity, can also influence the transmission ratio. However, the fiber rigidity may be fixed, such that the transmission ratio can be selected based on the stiffness provided by the spring element 15a in parallel with respect to the fiber optic strain sensor 3 and the spring element 15b in series with respect to the fiber optic strain sensor 3. By adjusting the rigidity parallel with respect to the fiber optic strain sensor 3 and in series with the fiber optic strain sensor 3, a desired transmission ratio provided by the body can be obtained. It will be appreciated that the spring elements on the outer regions (e.g., springs 15y, 15z in FIGS. 7 and 8) may have minimal effect on the transmission ratio. These outer spring elements 15y, 15z may be used for preventing twisting and bending during transportation and handling.

Two cases can be distinguished. In a first case, a combined stiffness provided by the second portion of the spring structure 15a and the fiber optic strain sensor 3 is much smaller than the stiffness of the first portion of the spring structure 15b. In this case, movement between anchors 7 and 9 is concentrated over the softer region and as such a large proportion of the strain is obtained over fiber optic strain sensor 3. Hence, the transmission ratio T is much smaller than 1. In a second case, the combined stiffness provided by the second portion of the spring structure 15a and the fiber optic strain sensor 3 is much larger than the stiffness of the first portion of the spring structure 15b. In this case, a large proportion of the movement between anchors 7 and 9 is concentrated over the spring structure 15b and a large proportion of the strain is also obtained over the first portion of the spring structure 15b. Hence, the transmission ratio T is much larger than 1.

Figure 7:
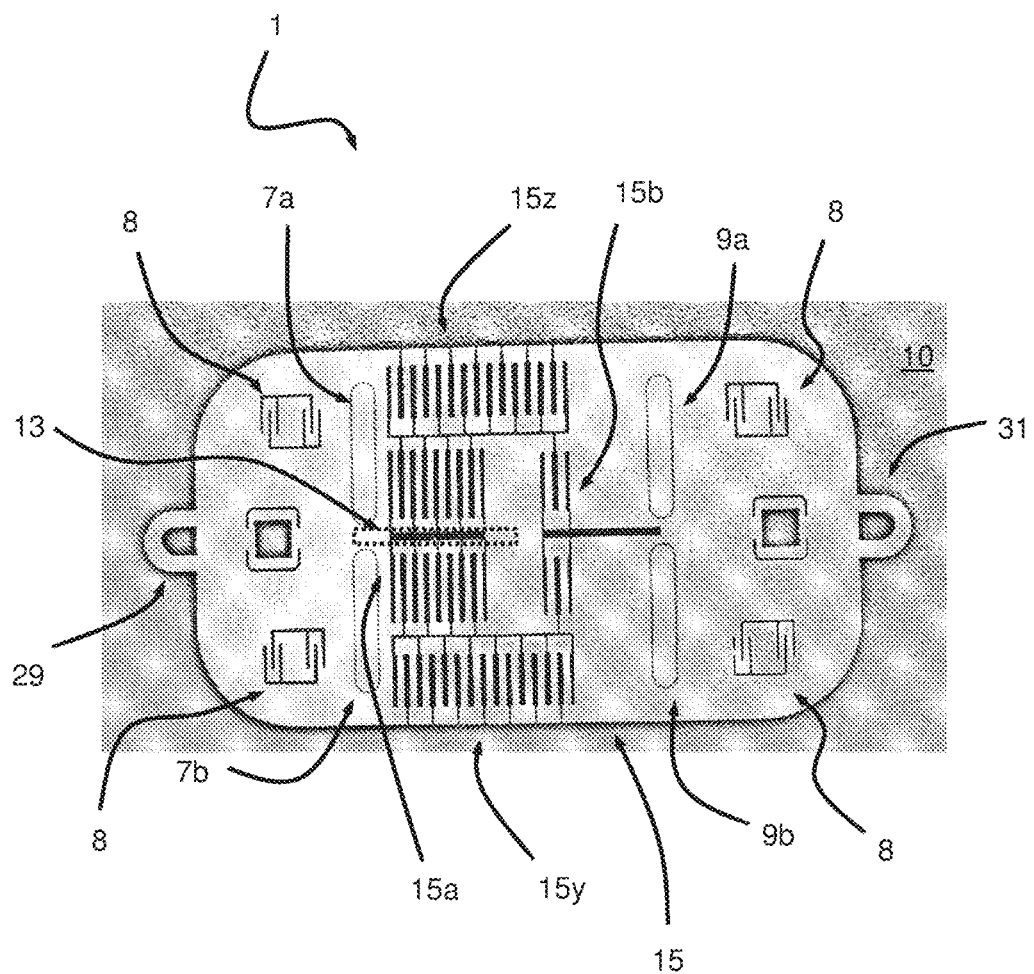
FIG. 7 shows a top view of an embodiment of a body.

FIG. 7 shows a top view of an embodiment of a body 1. A plurality of elastic spring elements are arranged in series for forming the spring structure 15. The side spring elements 15y and 15z are arranged in the frame 5 for providing additional rigidity to the body 1. In this way the structural integrity of the body 1 can be improved and/or the fragility of the body 1 can be reduced. The influence of the side spring elements on the transmission ratio may be limited or can be factored into the sensitivity.

The transmission ratio depends on the plurality of spring elements of the spring structure 15 arranged in series with respect to each other. The body 1 comprises a sensor connection portion 13 arranged for holding a fiber optic strain sensor (e.g., fiber Bragg grating) in a longitudinal direction in a region between the first anchor portions 7a, 7b and the second anchor portions 9a, 9b. At the anchor portions 7a, 7b, 9a, 9b, the frame 5 of the body 1 is anchored to the object 10 (e.g., wall, structure, etc.), for example by means of welding or gluing. If the object 10 deforms/stretches, the distance between the first anchor portions 7a, 7b and the second anchor portions 9a, 9b can change. However, as a result of the spring structure 15, only a part of the movement is actually transferred to the fiber optic strain sensor being clamped in the sensor connection portion 13 of the frame 5. In an example, the transmission is 10 to 1 scalar, wherein only a tenth of the strain is exerted on the fiber. However, the transmission can be adjusted to a desired value, for example needed for particular applications, by changing the configuration or characteristics of the spring structure 15. In an example, the welding locations 7a, 7b, 9a, 9b, can be pre-etched to be thinner such that the welding of the regions is requiring lower welding power and potentially lower modification of the material locally.

A predetermined perforated spring structure 15 in the frame 5 can be obtained in different ways (e.g., laser cutting, perforation, etc.). The plate-shaped body 1 can be compact and easy to manufacture. Additionally or alternatively, the sensing spring structures can be etched from thinner segment of the plate in comparison to the frame such that the springs are raised from the surface onto which they are welded by sufficient height to ensure that surface non-uniformity and the roughness does not influence the spring mechanism, its rigidity and linear region.

In the shown example of FIG. 7, an optional flexible area 8 is arranged adjacent the anchor portions. In this way, for instance when the frame 5 is attached to the object 10 by means of welding at the anchor portions 7a, 7b, 9a, 9b, it can be avoided that the induced stress on those locations resulting from welding would deform/warp the frame and off-axis tensions transmitted can be decoupled from the frame and can be prevented from influencing the sensing regions. Advantageously, the frame of the body can follow the structure/wall more closely (twisting and bending). Optionally, the optional flexible areas 8 are substantially rigid in non-axial direction and flexible in axial direction (i.e., direction in which strain measurements are performed).

Furthermore, the frame 5 further comprises optional flaps 29, 31 at opposite sides in the longitudinal direction of the body 1. These flaps 29, 31 are configured to fold upwards. In this way, a cable can be at least partially clamped by means of said one or more flaps 29, 31. The flap may be configured to form a U-shaped or O-shaped portion suitable for housing or gripping a communication cable for the fiber optic strain sensor 3 to be attached to the body 1. The flaps 29, 31 can be arranged on opposite ends of the frame 5 in a longitudinal direction in which the fiber optic strain sensor is to be arranged. The flap may be arranged such as to allow easy folding for keeping the cable in place.

Figure 8:
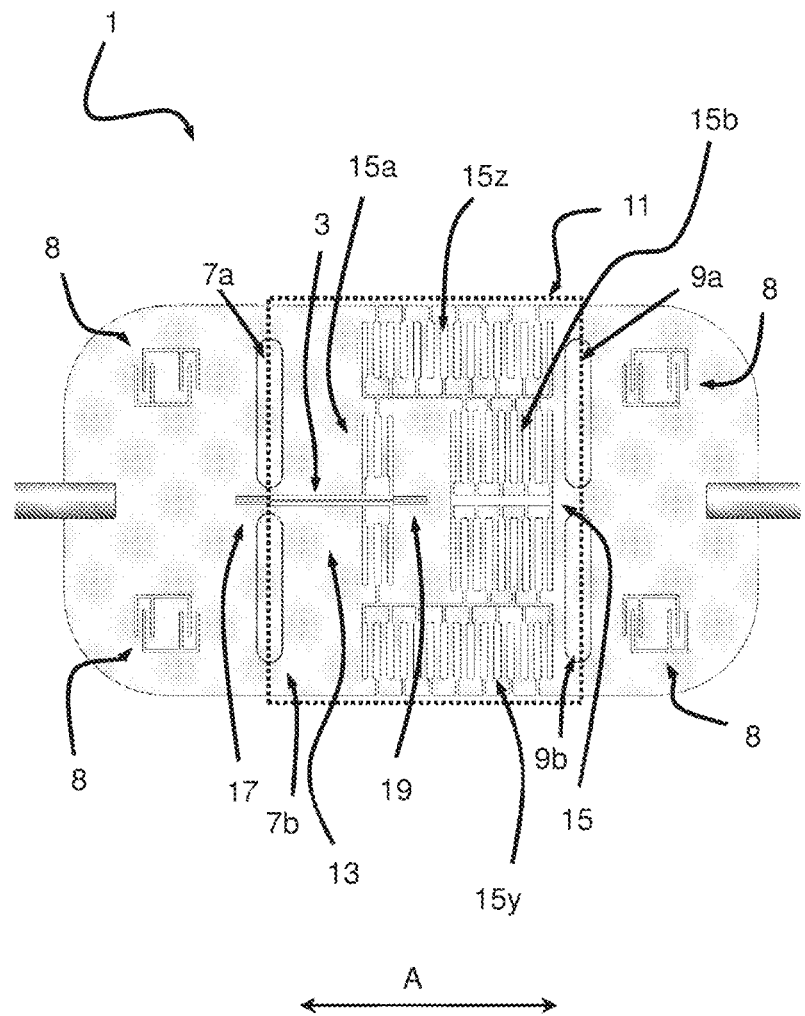
FIG. 8 shows a top view of a schematic diagram of a body.

FIG. 8 shows a top view of a schematic diagram of a body 1. The shown embodiment is similar to that of FIG. 7. In this embodiment a fiber optic strain sensor 3 is mounted on the body 1 on the sensor connection portion 13. Also in this embodiment, the side spring elements 15y, 15z are optional. The spring structure 15 in the strain sensitive region 11 of the frame 5 provides is configured to modify a strain transmission from the object to the sensor connection portion of the frame, such that a down conversion can be obtained of the deformation obtained between the first sensor anchor point 17 and the second sensor anchor point 19 as a result of a deformation between the first anchor portion 7a, 7b and the second anchor portion 9a, 9b.

The elastic portion of the frame 5 is formed by an elastic member acting as a spring. The frame 5 is formed by a perforated plate forming a mechanical spring structure 15. Optionally, the sensor is a fiber optic sensor. However, other types of strain sensors can also be used, such as for example an electrical strain gauge. The body 1 can enable measurement in a measurement direction A, depending on the orientation of the fiber optic strain sensor 3 held by the sensor connection portion 13.

A specific layout of the spring elements of the spring structure 15, a number of springs, a travel distance, an orientation of springs, a size and/or shape of the springs, a spring configuration, etc., can be adapted and/or designed such as to obtain a predetermined transmission ratio.

Figure 9:
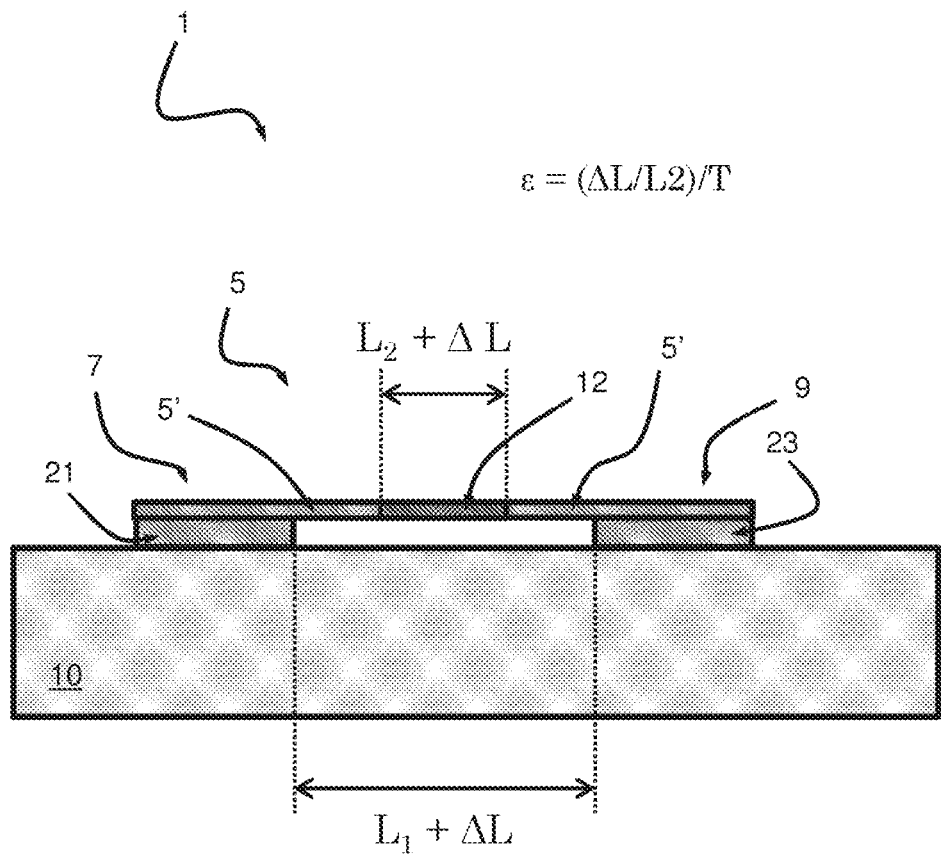
FIG. 9 shows a cross sectional side view of an embodiment of a body.

FIG. 9 shows a cross sectional side view of an embodiment of a body 1 connected to a body 10. The body 1 is welded or glued to the body 10 by means of welding or glue connection 21, 23 at the first anchor portion 7 and the second anchor portion 9 of the frame 5 of the body 1, respectively. The frame 5 comprises a measurement part 12. The remaining parts 5' of the frame 5 surrounding the measurement part 12 are substantially rigid with respect to the measurement part 12 of the frame 5. The measurement part 12 is elastic. Hence, if deformation of the body 10 results in a movement between the first anchor portion 7 and the second anchor portion 9 results in a distance change in $L_1$ by $\Delta L$, then, since section 5' is substantially more rigid then section 12, the length change will be substantially concentrated in section 12 such that the section length becomes $L_2+\Delta L'$. As such, the strain detected by fiber optic strain sensor located in section 12 will be $\varepsilon=\Delta L'/L_2=(\Delta L/L_1)/T$, where T is substantially smaller than 1. A larger area strain averaging can be obtained (signal can be averaged out over a longer distance). Furthermore, errors due to assembly of the body 1 may also be reduced.

Figure 10:
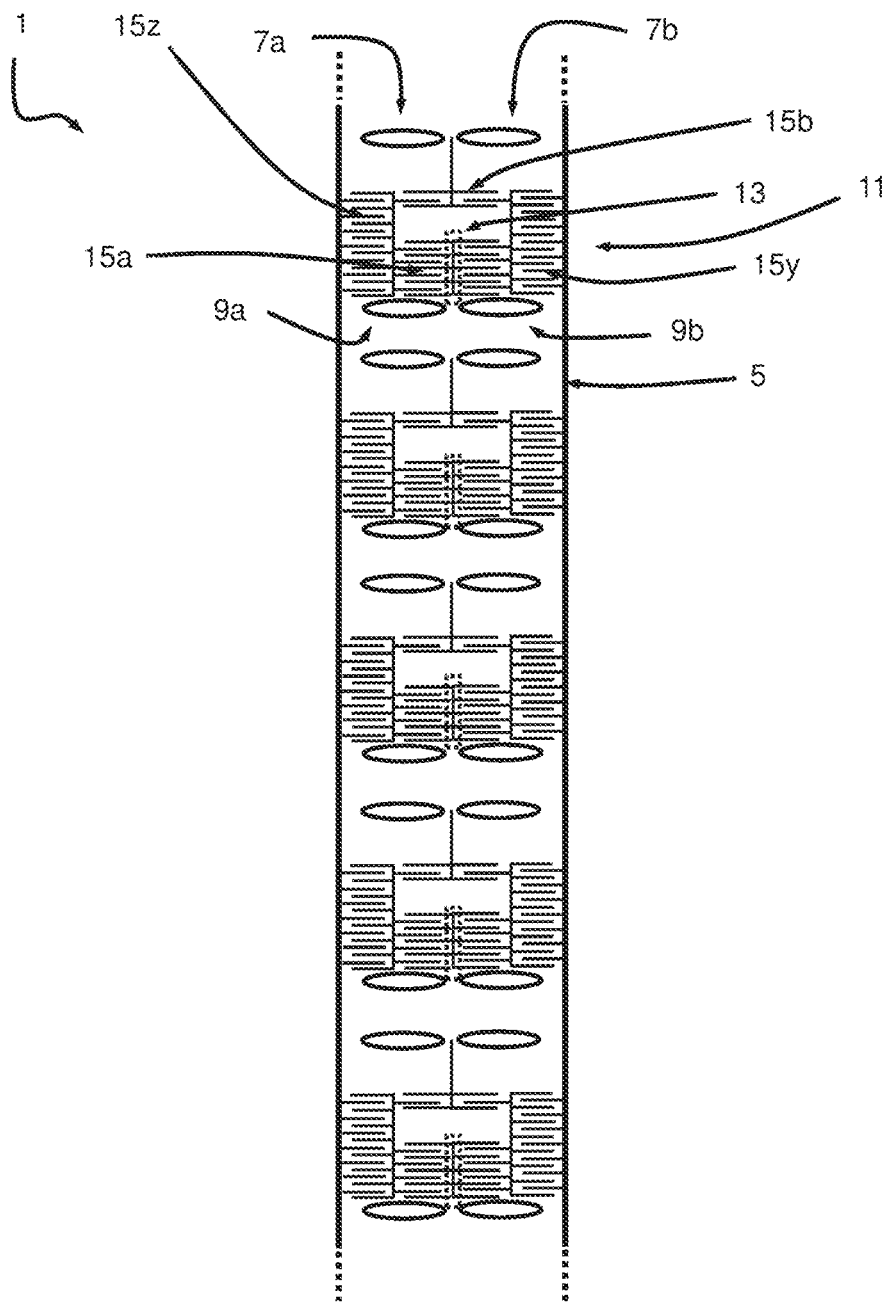
FIG. 10 shows a top view of an embodiment of a body.

FIG. 10 shows a top view of an embodiment of a body 1. The body 1 has an elongated shape and includes a plurality of anchor portions with sensing zones therebetween. In these sensing zones the fiber optic sensor is attached for enabling strain measurements according to a predetermined strain transmission ratio. The strain transmission ratio depends on the spring structure defined in the frame of the body 1. In this example, the spring structure is formed out by a plurality of cut-outs. The cut-outs are arranged to provide a spring in series and parallel with respect to the sensor connection portion 13 at which the fiber optic sensor 3 is to be connected. A plurality of consecutive strain sensitive regions 11 are formed in the longitudinal direction of the body 1 (vertical in figure). In this way, advantageously, one long strip can be formed with various sensing points distanced from each other in the axial/longitudinal direction of the strip, wherein the strip is attachable by means of the plurality of anchor points 7a, 7b, 9a, 9b on a structure (e.g., wall). In this way, the deformation of the structure can be mapped along the strip. A high sensor count can be obtained in such a strip. In an example, each fiber optic sensor 3 has a unique Bragg wavelength reflection, such that with one interrogation unit many strain points can be recorded for mapping the deformation of a structure more accurately. It is will be appreciated that the elongated body can have other configurations, e.g., different spring structure for obtaining different strain transmission ratios.

Figure 11:
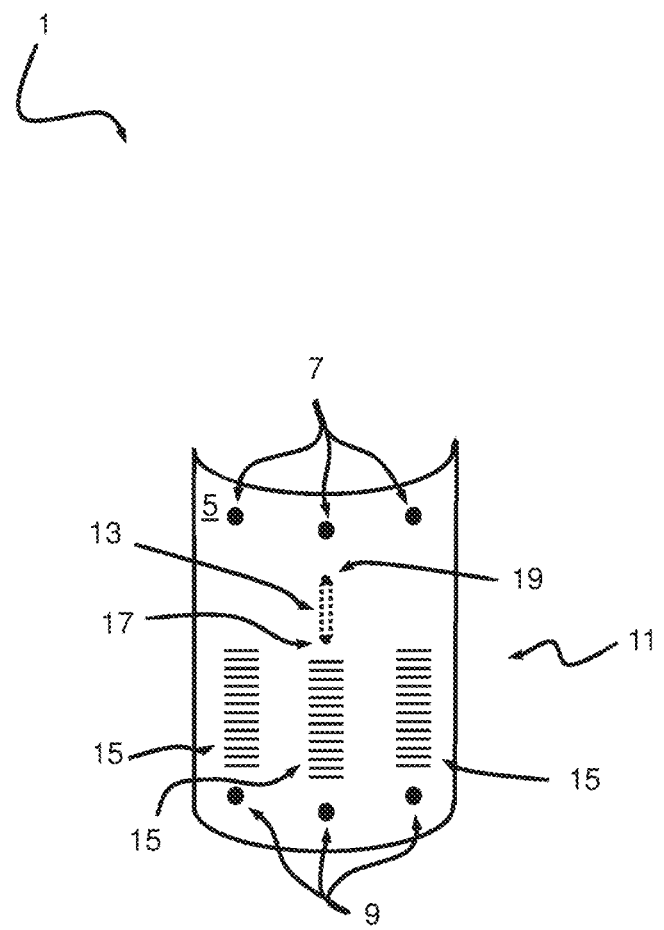
FIG. 11 shows a schematic diagram of an embodiment of a body.

FIG. 11 shows a schematic diagram of an embodiment of a body 1 in perspective view. The shape of the frame 5 can be complementary to the surface of the object to which the body is to be attached. The frame 5 can thus cover a substantial portion of the object at the location of attachment. The plate-shaped frame can be formed such as to facilitate attachment to a side of the object (e.g., wall structure). It can be mounted on the object by anchoring or securing the at least one first anchor portion 7 and the at least one second anchor portion 9 of the frame 5 to the object 10 (e.g., by means of welding, glue, fastening means, magnets, etc.). In this example, there are three first anchor portions 7 and three second anchor portions 9.

Figure 12:
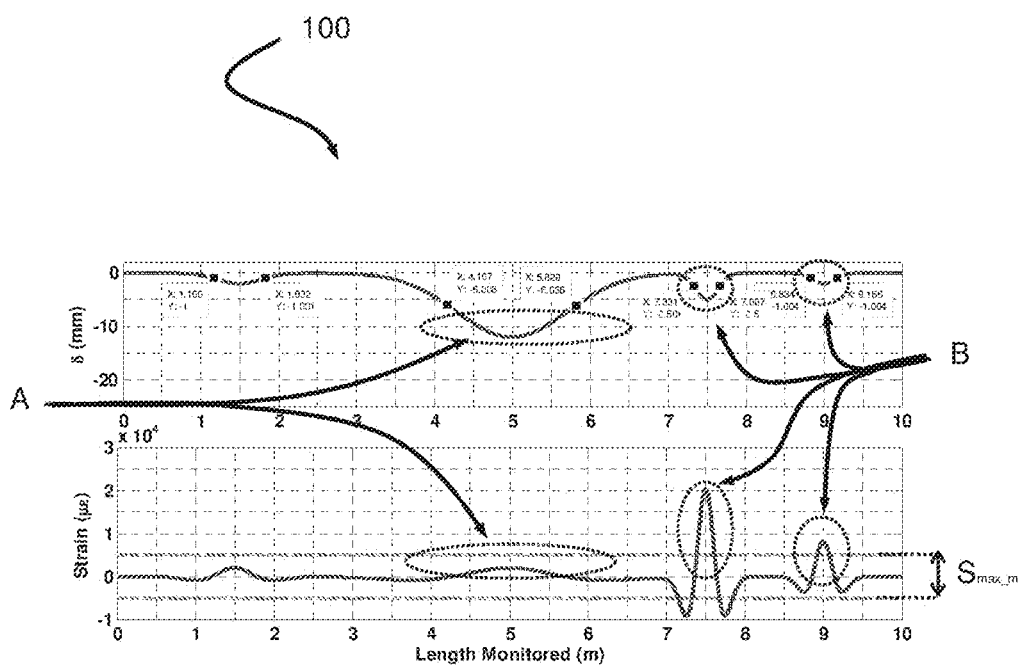
FIG. 12 shows an exemplary measurement plot.

FIG. 12 illustrates an exemplary measurement plot 100. The above plot shows the off-axis deformation δ (in millimeter) in function of a monitored length (in meters) of an object 10. A plurality of measurements are carried out along a length of the object. The bottom plot shows the determined strain (in microstrains με) in function of the monitored length (in meters) of the object 10. Relatively large deformations A may result in measurable strains without adapting the transmission ratio by means of the body 1. However, even larger deformations B may not be measurable in a correct fashion as a result of too steep peaks in the strain. Sharp turn may create large stresses locally (e.g., 20 000-30 000 microstrains), which may potentially damage a strain sensor 3 (e.g., fiber optic sensor). The maximum measurable range of strains measurable by the strain sensor 3 may be provided by $S_{max,m}$. By means mounting the same strain sensor onto the body 1, also these very steep peaks can become measurable, since a strain transmission from the object to the sensor connection portion 13 of the frame 5 is modified.

Furthermore, if the strain sensor 3 is pre-tensioned, it would need to be pre-tensioned to the maximum compressible load to be expected (depending on the application), and the pre-tensioning would have to remain over a long period of time. When deformations happen over years, pre-tensioning may result in creeping or slipping, which can result in an offset in the readings. Hence, by means of the body 1 it may be possible to minimize the pre-tension the strain sensor 3 according to the range needed.

Figure 13:
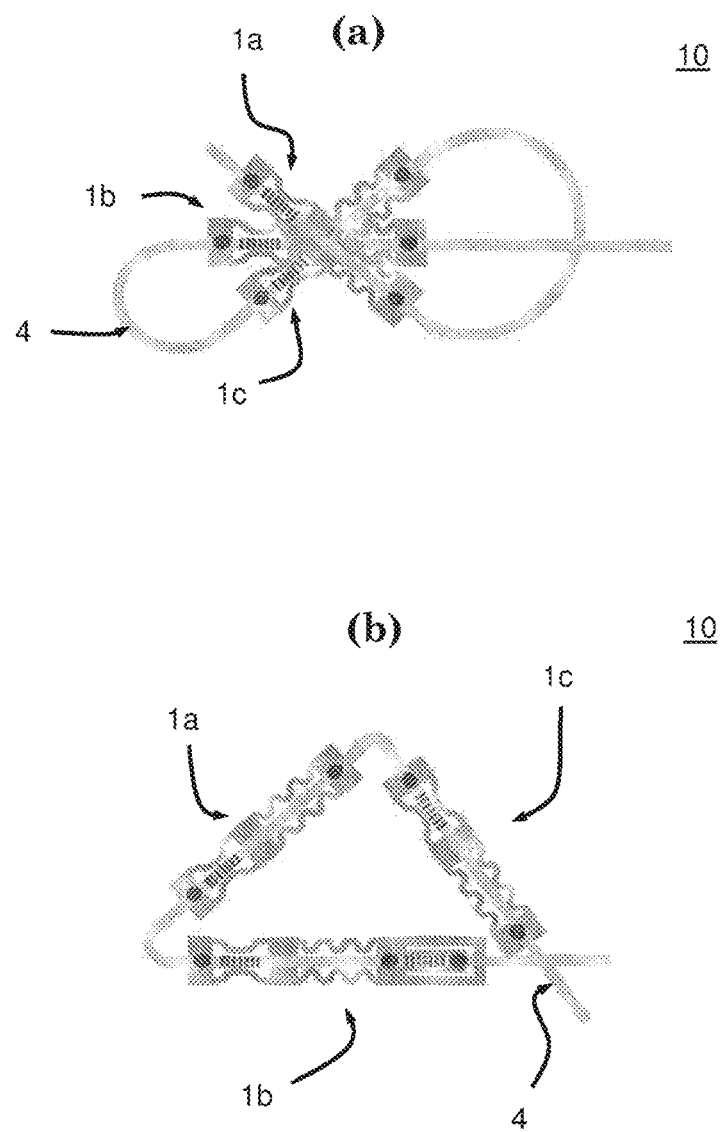
FIG. 13 shows a multiple fiber optic strain sensor configuration.

FIG. 13 shows a multiple fiber optic strain sensor configuration. In FIG. 13a, a rosette fiber optic strain sensor configuration is shown including three bodies 1a, 1b, 1c connected to each other. By means of a rosette configuration, strain measurements can be carried out in two or more directions. More than one fiber optic strain sensor is bonded to the same structure in definite relative positions. Different orientations are possible. The fiber optic strain sensors may for example be rotated at 120 degrees with respect to each other, but other angles are also envisaged. The sensing zones of the arrangement in FIG. 13a are co-located. In an example, the multiple bodies 1a, 1b, 1c are stacked on top of each other and rotated (e.g., 120 degrees) with respect to each other. The strain sensitive regions 11 between the anchor points 7, 9 can be overlapping and crossing each other centrally (cf. co-centered). Since the plurality of bodies are co-located, strain measurements can be performed from a same region of the structure (e.g., wall) to which the bodies are to be attached for performing the measurements. It is advantageous to center and/or overlap the measurement zones provided by the plurality of bodies, as shown in the rosette configuration in FIG. 13a. In the shown example, one fiber optic cable 4 is guided along the three bodies 1a, 1b, 1c.

An alternative example is shown in FIG. 13b, in which three bodies 1a, 1b, 1c are attached to the surface having different orientations. In this arrangement, the bodies are spatially distributed and not co-located physically. One fiber optic cable 4 is guided along the three bodies 1a, 1b, 1c. The arrangements shown in FIGS. 13a, 13b can be preassembled.

Figure 14:
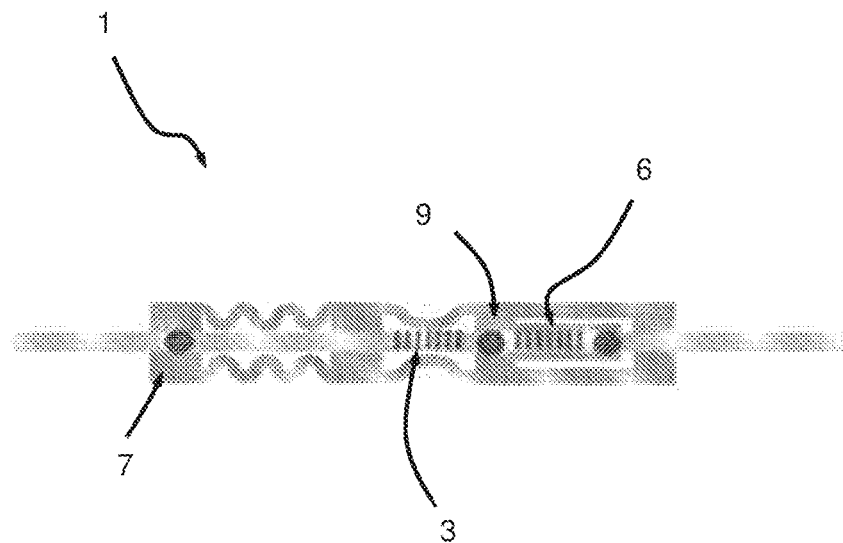
FIG. 14 shows a temperature compensation configuration.

FIG. 14 shows a body 1 having a temperature compensation configuration. A fiber optic strain sensor 3 is held within a region between anchor points 7 and 9. Further, a second fiber element 6 is provided in order to allow for temperature compensation. The second fiber element 6 is not strain coupled but is in thermal contact.

Figure 15:
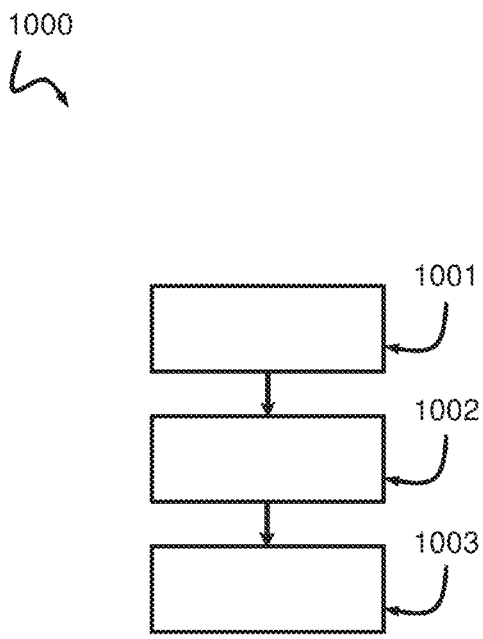
FIG. 15 shows a schematic diagram of a method.

FIG. 15 shows a schematic diagram of a method 1000 for determining strain in an object 10 using a body 1 for holding a fiber optic strain sensor 3, the body 1 comprising a surface mountable frame 5, the frame 5 being plate-shaped and including at least two anchor portions 7, 9 for enabling attachment to a surface of the object 10, a strain sensitive region 11 in an intermediate position between a first anchor portion 7 and a second anchor portion 9 of the at least two anchor portions 7,9, a sensor connection portion 13 configured to hold at least one fiber optic strain sensor 3 for enabling attachment of the fiber optic strain sensor 3 to the frame 5 in the strain sensitive region 11, and at least one elastic portion arranged in the strain sensitive region 11, the elastic portion being formed by a spring structure 15 configured to modify a strain transmission from the object 10 to the sensor connection portion 13 of the frame 5. In a first step 1001 of the method 1000, the frame is attached to the object by means of the at least two anchor portions. In a second step 1002, the fiber optic strain sensor is attached to the frame in the strain sensitive region by means of the sensor connection portion. In a third step 1003, a value indicative of strain in the object 10 is determined by means of the fiber optic strain sensor 3. It is appreciated that steps can be added or omitted in the method. Furthermore, the sequence of the steps can be changed. For instance step 1002 may be carried out before step 1001.

The at least two anchor portions 7, 9 provide means for securing the frame 5 of the body 1 to the object 10 so as to allow performing strain measurements by means of the fiber optic strain sensor 3.

The elastic portion can be interposed in series with respect to the fiber optic strain sensor 3 between the at least two anchor portions 7, 9, in the strain sensitive region 11, in order to reduce the transmission of strain to the sensor connection portion 13 of the frame 5 where the fiber optic strain sensor 3 is to be mounted.

The spring structure 15 can be an elastic member in the frame formed by one or more cut-outs, grooves, slits, trenches, thinned sections and/or holes in the frame 5. The elastic portion may at least partially surround the sensor connection portion 13. The elastic portion surrounding the sensor connection portion 13 can also be strained/stressed when the strain sensitive region 13 experiences a strain resulting from a relative movement between the at least first anchor portion 7 and the at least one second anchor portion 9.

A strain sensor 3 may be understood as any type of a deformation gauge. Preferably, a fiber optic strain sensor is employed. However, other types of strain sensors can also be used for measuring strains/stress/deformations by means of the body 1. The strain sensor 3 is attachable to the frame 5 of the body 1 at the sensor connection portion 13. However, the strain sensor 3 may also be integrated in the body 1. In this way, an integrated design can be obtained which is easy to use.

The drawings provide examples of embodiments. However, those skilled in the art will appreciate that one or more of the described elements may well be combined into a single functional element. Alternatively, certain elements may be split into multiple functional elements. Elements or features from one embodiment may be added to another embodiment. Numerous variations, whether explicitly given in the specification or not, such as differences in structure, dimension, and use of material, are possible.

The term strain may be understood as an engineering strain (also known as Cauchy strain), which can be expressed as the ratio of the total deformation to the initial dimension of the material object in which the forces are being applied. The engineering normal strain of a material line element or fiber axially loaded can be expressed as the change in length ΔL per unit of the original length L of the line element or fibers. The normal strain is positive if the material fibers are stretched and negative if they are compressed. A measure of strain is often expressed in microstrains or parts per million.

It will be understood that when a feature, such as a frame, is referred to as being "on" another feature or element, such as an object, it can be directly on the other feature or element or intervening features and/or elements may also be present. In contrast, when an element is referred to as being "directly on" another feature or element, there are no intervening elements present. It will also be understood that, when a feature or element is referred to as being "connected", "fixed", "fastened", "secured", "affixed", "anchored", "attached" or "coupled" to another feature or element, it can be directly connected, fixed, fastened, secured, affixed, anchored, attached or coupled to the other element or intervening elements may be present. In contrast, when a feature or element is referred to as being "directly connected", "directly fixed,", "directly fastened", "directly secured", "directly affixed", "directly anchored", "directly attached" or "directly coupled" to another element, there are no intervening elements present.

Spatially relative terms, such as "under", "below", "lower", "over", "upper", "front", "back", and the like, may be used herein for ease of description to describe one element or feature's relationship to another element(s) or feature(s) as illustrated in the figures. It will be understood that the spatially relative terms are intended to encompass different orientations of the body in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A body for holding a fiber optic strain sensor for determining strain in an object, the body comprising a surface mountable frame, the frame being plate-shaped and including:
    at least two anchor portions for enabling attachment to a surface of the object,
    a strain sensitive region in an intermediate position between a first anchor portion and a second anchor portion of the at least two anchor portions,
    a sensor connection portion configured to clamp at least one strain sensor on the frame in the strain sensitive region, and
    a plate-shaped spring structure in the strain sensitive region, the plate-shaped spring structure forming an integral part of the frame and being configured to modify a strain transmission from the object to the sensor connection portion of the frame.

2. The body according to claim 1, wherein the plate-shaped spring structure comprises a spring element arranged in series between the sensor connection portion of the frame and one of the at least two anchor portions of the frame.

3. The body according to claim 2, wherein the plate-shaped spring structure comprises an additional spring element arranged parallel to the sensor connection portion.

4. The body according to claim 1, wherein the plate-shaped spring structure is formed by including at least one of one or more cut-outs, trenches or slits in the strain sensitive region of the frame.

5. The body according to claim 1, wherein the plate-shaped spring structure in the frame is formed by means of laser cutting.

6. The body according to claim 1, wherein the sensor connection portion is configured to hold the strain sensor so that the strain sensor extends in the strain sensitive region of the frame in a direction that is substantially parallel to a direction of the sensing action applied by the first and second anchor portions on the strain sensitive region.

7. The body according to claim 1, wherein the frame is configured to hold a plurality of strain sensors extending in different directions with respect to each other, for sensing input actions applied in different directions.

8. The body according to claim 1, the body having an elongated frame having a plurality of different strain sensitive regions, pairs of anchor portions, strain sensitive regions, sensor connection portions, and elastic portions arranged in succession in a longitudinal direction of the body.

9. A system for determining strain in an object, the system comprising one or more bodies according to claim 1 and one or more fiber optic strain sensors attached to the sensor connection portions of the frames of the bodies for sensing one or more input actions applied in one or more directions.

10. A use of the body according to claim 1 for determining strain in an object by means of a fiber optic strain sensor.

11. A method for determining strain in an object using a body for holding a fiber optic strain sensor, the body comprising a surface mountable frame which is plate-shaped, the frame comprising at least two anchor portions for enabling attachment to a surface of the object, a strain sensitive region in an intermediate position between a first anchor portion and a second anchor portion of the at least two anchor portions, a sensor connection portion configured to hold clamp at least one strain sensor on the frame in the strain sensitive region, and a plate-shaped spring structure in the strain sensitive region, the plate-shaped spring structure forming an integral part of the frame and being configured to modify a strain transmission from the object to the sensor connection portion of the frame, the method comprising:
    attaching the frame to the objects by means of the at least two anchor portions,
    anchoring the strain sensor to the frame in the strain sensitive region by means of the sensor connection portion, and
    determining a value indicative of strain in the object by means of the strain sensor.

12. A method for manufacturing a body for holding a fiber optic strain sensor for determining strain in an object, the body comprising a surface mountable frame, the frame being plate-shaped and including at least two anchor portions for enabling attachment to a surface of the object, a strain sensitive region in an intermediate position between a first anchor portion and a second anchor portion of the at least two anchor portions, a sensor connection portion configured to clamp at least one strain sensor on the frame in the strain sensitive region, the method comprising:

forming a plate-shaped spring structure in the strain sensitive region by means of laser cut features, the spring structure forming thereby an integral part of the frame and being configured to modify a strain transmission from the object to the sensor connection portion of the frame.

13. The method according to claim 12, wherein the laser cut features include at least one of one or more cut-outs, trenches or slits in the strain sensitive region of the frame.

* * * * *